UNITED STATES PATENT OFFICE.

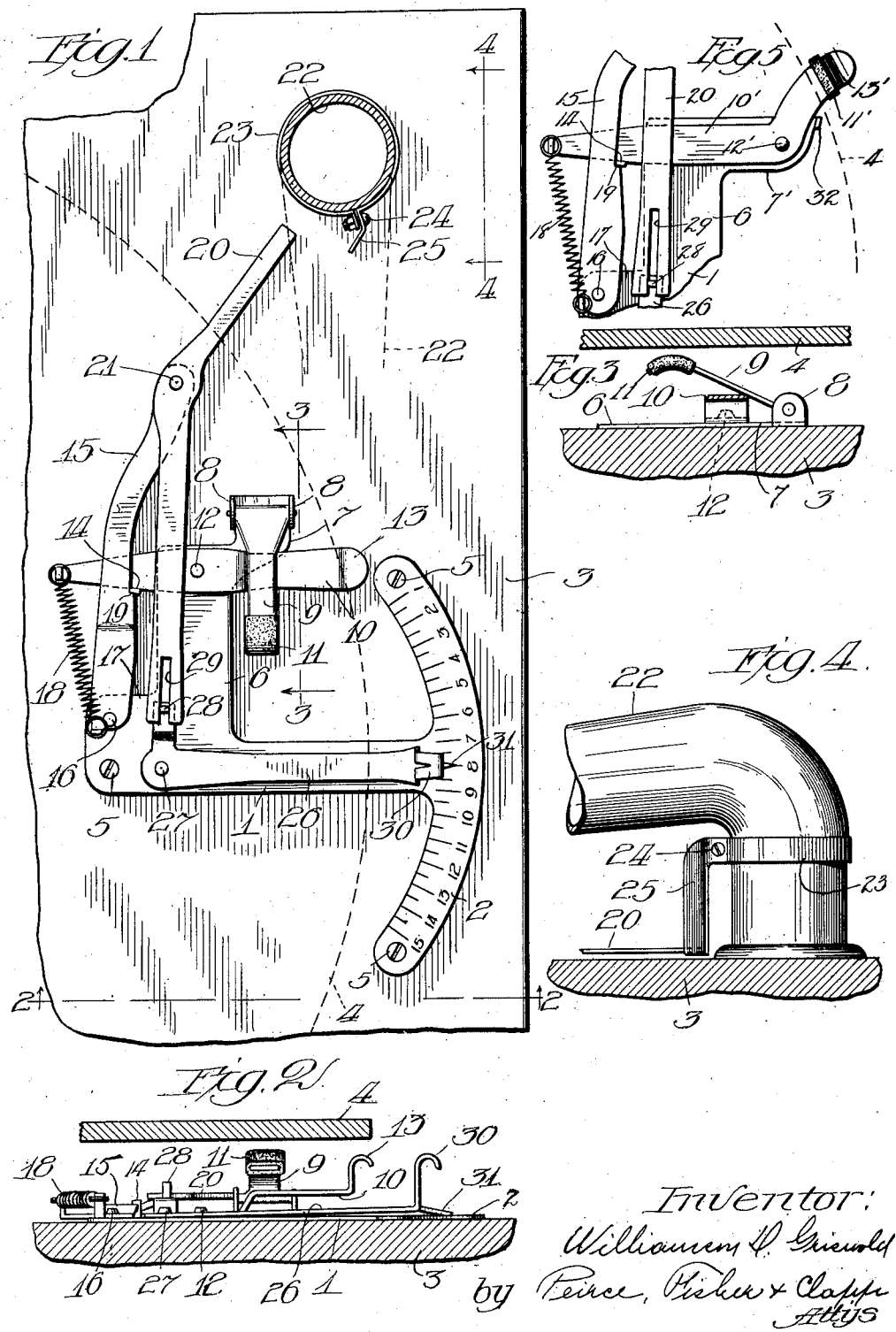

WILLIAMSON D. GRISWOLD, OF BURLINGTON, IOWA.

AUTOMATIC STOP FOR PHONOGRAPHS.

1,339,058.   Specification of Letters Patent.   Patented May 4, 1920.

Application filed March 27, 1919. Serial No. 285,430.

*To all whom it may concern:*

Be it known that I, WILLIAMSON D. GRISWOLD, a citizen of the United States, and a resident of Burlington, county of Des Moines, and State of Iowa, have invented certain new and useful Improvements in Automatic Stops for Phonographs, of which the following is a specification.

The invention relates to automatic stops for phonographs and seeks to provide a simple construction which can be inexpensively formed of sheet metal parts and easily applied to phonographs now in use and which can be readily and accurately set or adjusted to positively arrest the operation of the phonograph at the end of the reproduction of a record. The invention consists in the features of improvement hereinafter set forth, illustrated in the accompanying drawings and more particularly pointed out in the appended claims.

In the drawings, Figure 1 is a plan view of the improved automatic stop mechanism as applied in position on the top of the phonograph casing, parts of the phonograph being shown in dotted lines. Figs. 2, 3 and 4 are sections on the lines 2—2, 3—3 and 4—4 respectively of Fig. 1. Fig. 5 is a detail plan view illustrating a modification.

The parts of the improved stop device are carried on a support which is preferably in the form of a thin, flat bar or plate 1 which is formed of sheet metal and provided at its outer end with an integral segmental index portion 2. This supporting plate or bar is adapted to be mounted upon the upper surface of the casing 3 of the talking machine and beneath the turn-table 4. Preferably, the supporting bar or plate 1 is arranged on the upper face of the casing 3 on one side of and substantially in line with the central spindle which carries the turn-table and with the index portion 2 exposed beyond the edge of the turn-table. The support is preferably held in place in this position by screws 5 extending through perforations at the ends of the index portion 2 and at the inner end of the plate or bar 1.

Adjacent its inner end the plate or bar 1 is provided with a rearwardly projecting integral portion 6 having an offset 7, the rearmost part of which is provided with a pair of up-turned, perforated ears 8. A brake 9 is pivoted between the ears 8 and extends upwardly and forwardly therefrom over a brake actuating lever 10, the upper front end of the brake being provided with a pad or shoe 11 which, when the brake is in operation, is arranged to engage the under face of the turn-table 4 and hold it against rotation.

The brake lever 10 is connected by a pivot 12 to the rear end of the part 6 of the base plate and extends outwardly from its pivot beneath the brake 9. This outwardly projecting portion upon which the brake 9 rests is upwardly offset, as most clearly shown in Figs. 2 and 3, and has an up-turned portion or handle 13 at its outer end which is exposed beyond the outer edge of the turn-table and can be engaged by the user of the machine to shift the lever and release the brake.

The brake lever extends inwardly beyond its pivot 12 and is provided adjacent its inner end with an up-turned lug 14 which is arranged to bear against the edge of a latch lever 15. The latter is connected by a pivot 16 to a rearwardly extending lug 17 on the inner end of the base plate 1 and extends rearwardly therefrom across the rear end of the brake lever, the extreme rear end of the latch lever being slightly out-turned, as shown, and the main body thereof being arranged substantially at right angles to the brake lever.

A coiled actuating spring 18 is connected at one end to the rear end of the brake lever 10 and at its other end to the forward end of the latch lever 15 at a point in front of and adjacent the pivot of the latter. The outer edge of the latch lever is provided with a shoulder 19 which is adapted to engage the upwardly projecting lug 14 of the brake-lever. The spring 18 tends to turn the brake lever in left-hand direction and the latch lever in right-hand direction, and so forces the outer edge of the latch lever against the lug 14. When the latter is engaged with the shoulder 19, the spring 18 is held under tension and in this position the brake 9, which is controlled by the lever 10, does not engage the turn-table 4 and the latter is free to rotate. The arrangement is such that while a single spring serves to control both the brake lever and latch lever, the pressure exerted by the spring on the latter is slight, so that it can be readily released. But when the latch is released, the spring exerts considerable pressure upon the lever 10 which in turn presses the brake 9 upwardly and forces the brake-shoe 11 against the underside of the turn-table to arrest its operation. The brake may be readily released by the user of the machine by shifting the brake lever in reverse direction against the tension of the spring 18 and when so shifted the shoulder 19 of the latch reëngages the lug 14 of the brake lever and holds the parts in the playing position shown in the drawings.

A trip-arm 20 is connected between its ends to the rear free end of the latch lever 15 by a pivot 21. The rear portion of the trip-arm extends rearwardly beyond the edge of the turn-table and is arranged to be engaged by a part moving with the sound box arm 22. Preferably a split clamp ring 23, the ends of which are connected by a screw-bolt 24, is mounted upon the vertically disposed pivoted rear end of the reproducer tone arm 22. This clamp ring is provided with a depending lug 25 which is arranged to engage the rear end of the trip-arm 20. The clamp ring 23 may be adjusted to vary the position of the lug 25.

The trip-arm 20 is adjusted or set in different positions in accordance with the lengths of different records by means of an adjusting lever 26 which is preferably in the form of a bell-crank. This bell-crank lever is connected at its inner end by a pivot 27 to the inner end of the supporting plate 1 and the rearwardly extending short arm has an upwardly projecting pin 28 which engages a slot 29 in the forward end of the trip-arm 20. The outer end of the adjusting lever is provided with an up-turned portion or handle 30 and with an outwardly projecting, down-turned index pointer 31 which is arranged to coöperate with suitable marks on the scale portion 2. Preferably, the index pointer is sharpened and the marks of the scale are in the form of grooves or seats into which the pointer snaps to hold the lever 26 in adjusted position and against accidental movement. The leverage between the adjusting lever 26 and the trip-arm 20 is such that the movement of the handle 30 and indicator 31 at the outer end of the adjusting lever is much greater than the adjustment effected thereby of the rear end of the trip-arm which is engaged by the lug 25. For this reason, the adjustment of the trip-arm can be effected with great accuracy. Furthermore, since the adjusting lever is held against accidental movement, it maintains the trip-arm in its adjusted position relatively to the latch 15.

The parts of the improved stop device are all preferably formed of sheet metal so that it can be inexpensively constructed. It can be readily mounted upon the upper face of the phonograph casing in the position shown in the drawings. Preferably, the clamp ring 23 is so adjusted on the pivoted end of the tone-arm that the lug 25 will engage the trip-arm when the adjusting lever 26 is in mid-position and the tone-arm has moved inwardly a sufficient distance to reproduce a record of medium length. Preferably also the different records are each provided with a number corresponding to the index numbers on the scale portion 2 and which number can be readily determined by manipulating the adjusting lever 26 the first time the record is played. Thereafter in playing a record it is only necessary to position the adjusting lever 26 in accordance with the index number on the record to be played and release the brake by shifting the lever 10 through the medium of the handle 13 and thereby locking the brake lever in released position by means of the latch 15. At the end of the reproduction of the record the lug 25 will engage the rear end of the trip-arm 20 and thereby trip the latch 15 so that the spring 18 will shift the latch 10 and apply the brake to arrest the turn-table.

It should be noted that the trip-arm is positively connected to the latch 15 and adjusting lever 26, but is arranged to move with either of these parts independently of the other. That is to say, when the adjusting lever 26 is shifted, the trip-arm is moved independently of the latch and is thereby accurately adjusted or set to arrest the playing of the record at the proper point. When the end of the record is reached, the trip-arm 20 is shifted independently of the adjusting lever 26 and positively trips the latch 15 to permit the operation of the brake lever. It should also be noted that the trip arm 20 is a floating lever, that is to say, it has no fixed pivot. When it is shifted by the adjusting lever 26 the trip arm moves about its pivotal connection 21 with the latch lever 15 without moving the latter and when it is shifted to release the latch lever, it then swings about the pin 28 as a pivot without shifting the adjusting lever. By reason of this arrangement, the adjustment and releasing operation of the trip arm are accurately and positively effected.

The construction can be simplified by mounting the brake shoe directly on the brake lever, as shown in Fig. 5. In this form, the extension 7' of the base plate extends outwardly substantially at right angles to the portion 6 thereof and the brake lever 10' is pivoted at 12' upon the outer end of this extension. The brake lever 10' is in the form of a bell crank and the shorter arm, which is preferably slightly curved, extends rearwardly and outwardly beyond the periphery of the turntable 4. The upwardly extending handle or finger piece 13' upon the outer end of the brake lever carries a brake shoe 11' of rubber, felt or the like, which is arranged to engage the outer periphery of the turn table. Preferably, also, an upturned lug 32 is provided upon the end of the extension 7' of the base plate to limit the rotation of the brake lever 10' in right hand direction. The construction is otherwise entirely similar to that shown in the other views. When the latch 15 is tripped, the spring 18 rotates the brake lever 10' in the left-hand direction and forces the brake shoe 11' snugly against the periphery of the turntable to arrest and hold it against movement. By means of the finger piece 13', the user of the machine can move the brake lever in opposite direction to release the brake and again engage the lever with the latch. The stop 32 limits the movement of the lever in this direction and prevents the user from unduly stretching the actuating spring.

Obviously, changes may be made in the details set forth without departure from the essentials of the invention as defined in the claims.

I claim as my invention:

1. An automatic stop for phonographs, comprising a brake lever, a latch therefor, a trip-arm for releasing said latch, and an adjusting lever for said trip-arm, said trip-arm being positively connected to said latch and to said adjusting lever and adapted to shift with each of said parts independently of the other, substantially as described.

2. An automatic stop for phonographs, comprising a brake lever, a latch therefor, a trip for releasing said latch, a lever for adjusting said trip, and a supporting plate whereon said brake lever, latch and adjusting lever are pivoted, said adjusting lever and said plate having an index pointer and scale and said trip being positively connected to said latch and to adjusting lever to shift with each of said parts independently of the other, substantially as described.

3. An automatic stop for phonographs, comprising a supporting plate adapted to be mounted upon the top of the machine beneath the turn-table, a spring-actuated brake lever pivoted on said plate, a spring-actuated latch for said lever mounted on said plate, a trip connected to said latch to release the same, and an adjusting lever pivoted on said plate and connected to said trip to adjust the same independently of said latch, said trip being shifted independently of said adjusting lever to release said latch and said adjusting lever and said supporting plate having an index pointer and scale adapted to hold said lever in adjusted position, substantially as described.

4. An automatic stop for phonographs, comprising a supporting plate adapted to be mounted upon the top of the machine beneath the turn-table, brake and latch levers pivoted on said plate and arranged substantially at right angles to each other, a spring connected to said levers to hold the same in engagement and actuate said brake lever, a trip-arm pivoted on the free end of said latch lever and arranged to be engaged by a moving member of the machine to positively trip said latch, and an adjusting lever pivoted on said plate and having a pin-and-slot connection with said trip-arm to adjust the same independently of said latch, substantially as described.

5. An automatic stop for phonographs, comprising a supporting plate adapted to be mounted upon the top of the machine beneath the turn-table, a spring actuated brake-member, a spring actuated latch lever for said brake member pivoted on said plate, an adjusting lever pivoted on said plate, and a latch-releasing floating trip-arm having a pivotal connection with one of said levers and a pivotal pin-and-slot connection with the other lever, substantially as described.

6. An automatic stop for phonographs, comprising a collar adapted to be adjustably secured to the reproducer arm and having a depending lug, a supporting plate adapted to be mounted on the top of the machine beneath the turn-table, a turn-table brake mounted on said plate, a latch-lever and an adjusting lever fulcrumed on said plate, said adjusting lever and plate having an index pointer and scale, and a trip-arm positively connected to said adjusting and said latch levers to shift with either lever independently of the other, said trip-arm being arranged to be engaged by said lug, substantially as described.

7. An automatic stop for phonographs comprising a brake lever, a latch therefor, a trip arm adapted to be engaged by a moving part of the phonograph to release said latch, and a lever positively connected to said trip arm to adjust the same in opposite directions, said trip arm being shiftable independently of said adjusting lever to release said latch, substantially as described.

8. An automatic stop for phonographs comprising a supporting plate adapted to be mounted upon the top of the machine beneath the turntable, a brake lever pivoted on said plate, a latch for said brake lever mounted on said plate, a trip arm adapted to be engaged by a moving part of the phonograph to release said latch, and an adjusting lever pivotally mounted on said plate and connected to said trip arm to adjust the same in opposite directions, said trip arm being movable independently of said adjusting lever to release said latch, and said adjusting lever and said plate having coöperating means for holding said lever in adjusted position.

9. An automatic stop for phonographs comprising a brake, a latch for said brake, an adjusting lever and a latch-releasing, floating trip arm having separate pivotal connections with said latch and said adjusting lever and being movable with either of said parts about its pivotal connection with the other part, substantially as described.

10. An automatic stop for phonographs comprising a supporting plate adapted to be mounted on the machine beneath the turntable, a brake lever pivotally mounted on said plate, a latch lever pivotally mounted on said plate for holding said brake lever in disengaged position, an adjusting lever pivotally mounted on said plate, and a floating trip arm having separate pivotal connections with said latch lever and said adjusting lever at points removed from the pivots of said levers, whereby said trip arm is positively connected to shift with either of said levers independently of the other.

11. An automatic stop for phonographs comprising a supporting plate, a brake lever mounted thereon, a latch lever mounted on said plate for holding said brake lever in disengaged position, a common actuating spring connecting said brake lever and said latch lever, a trip arranged to be engaged by a moving part of the phonograph and connected to said latch lever to release the same, a lever mounted on said plate and connected to said trip for adjusting the same, said adjusting lever and said brake lever having accessible free ends and arranged to be manually shifted, and a stop on said plate for limiting the releasing shift of said brake lever, substantially as described.

12. An automatic stop for phonographs comprising a brake, a latch for holding said brake in released position, an adjusting lever, a supporting plate whereon said brake, latch and adjusting lever are mounted, and a floating trip-arm pivotally connected at one point to said latch to release the same and pivotally connected at another point to said lever to be adjusted thereby, said lever and said plate having an index pointer and scale for indicating the adjustment of said trip-arm.

13. An automatic stop for phonographs comprising a lug adapted to be adjustably mounted on the reproducer arm, a supporting plate adapted to be fixed in position on top of the machine beneath the turntable, a brake, a latch therefor and an adjusting lever mounted on said plate, and a floating trip-arm pivotally connected at one point to said latch to release the same and pivotally connected at another point to said lever to be adjusted thereby, said lever and said plate having an index pointer and scale for indicating the adjustment of said trip-arm.

14. An automatic stop for phonographs comprising a spring actuated brake, a spring actuated, pivoted latch lever for holding said brake in released position, a trip-arm pivotally mounted on the free end of said latch and arranged to be shifted by a moving part of the phonograph to release the latch, means for adjusting said trip-arm relatively to said latch, and a coöperating index pointer and scale arranged to indicate and maintain the adjustment of said trip-arm relatively to said latch.

15. An automatic stop for phonographs comprising a lug adapted to be adjustably mounted on the reproducer arm, a supporting plate arranged to be mounted beneath and on one side of the axis of the turntable and having an index scale on its outer projecting end, a spring actuated brake lever pivotally mounted on said plate, a spring actuated latch lever pivoted on said plate and extending rearwardly across the inner end of said brake lever and having a shoulder arranged to engage the brake lever to hold the same in released position, a trip-arm pivotally mounted between its ends on the rear end of said latch lever and having a rearwardly projecting portion adapted to be engaged by said lug, and an adjusting lever fulcrumed on the inner end of said supporting plate, said adjusting lever being pivotally connected at its inner end to the forward end of said trip-arm and having an indicating pointer at its outer end coöperating with said index scale.

WILLIAMSON D. GRISWOLD.